(12) United States Patent
Seidel et al.

(10) Patent No.: US 8,779,033 B2
(45) Date of Patent: Jul. 15, 2014

(54) GLASS FIBER REINFORCED POLYCARBONATE MOLDING COMPOSITIONS

(71) Applicant: Bayer Materialscience AG, Leverkusen (DE)

(72) Inventors: Andreas Seidel, Dormagen (DE); Michael Erkelenz, Duisburg (DE); Eckhard Wenz, Cologne (DE)

(73) Assignee: Bayer Materialscience AG, Leverkusen (DE)

( * ) Notice: Subject to any disclaimer, the term of this patent is extended or adjusted under 35 U.S.C. 154(b) by 0 days.

(21) Appl. No.: 13/875,696

(22) Filed: May 2, 2013

(65) Prior Publication Data

US 2013/0253092 A1    Sep. 26, 2013

Related U.S. Application Data

(63) Continuation of application No. 12/191,399, filed on Aug. 14, 2008, now abandoned.

(30) Foreign Application Priority Data

Aug. 16, 2007  (DE) .......................... 10 2007 038 438

(51) Int. Cl.
   *C08L 69/00* (2006.01)
(52) U.S. Cl.
   USPC ............ 523/436; 524/147; 524/311; 524/494

(58) Field of Classification Search
   USPC .................. 524/265, 147, 311, 494; 523/436
   See application file for complete search history.

(56) References Cited

U.S. PATENT DOCUMENTS

| | | |
|---|---|---|
| 4,140,833 A | 2/1979 | McCoy |
| 5,178,657 A | 1/1993 | Gicquel |
| 5,262,236 A | 11/1993 | Brannon |
| 5,661,200 A | 8/1997 | Boudreaux, Jr. et al. |
| 2003/0166761 A1 | 9/2003 | Weber et al. |
| 2006/0094813 A1 | 5/2006 | Warth et al. |

FOREIGN PATENT DOCUMENTS

| | | |
|---|---|---|
| EP | 0345652 A2 | 12/1989 |
| EP | 0624601 A1 | 11/1994 |
| EP | 0647679 A1 | 4/1995 |
| EP | 1038920 A1 | 9/2000 |
| EP | 1240250 A1 | 9/2002 |
| JP | 2000-119463 A | 4/2000 |
| JP | 2001-164105 A | 6/2001 |
| WO | 8404317 A1 | 11/1984 |
| WO | 0039210 A1 | 7/2000 |
| WO | 2006040087 A1 | 4/2006 |

*Primary Examiner* — John Uselding
(74) *Attorney, Agent, or Firm* — Miles & Stockbridge P.C.

(57) ABSTRACT

The invention relates to glass fiber reinforced polycarbonate compositions and molding compositions of the present inventor and distinguished by high rigidity, high flowabillty, high processing stability, good chemical resistance and good aging resistance vis-à-vis the effects of light and heat compared with the prior art. The present invention also relates to the use of the compositions for the production of shaded articles and to shaped articles comprising the compositions according to the invention.

7 Claims, No Drawings

GLASS FIBER REINFORCED POLYCARBONATE MOLDING COMPOSITIONS

CROSS REFERENCE TO RELATED APPLICATIONS

This application is a Continuation of U.S. application Ser. No. 12/191,399, filed Aug. 14, 2008, which claims priority from DE 102007038438 filed Aug. 16, 2007, the content of both of which are incorporated herein by reference in their entireties.

BACKGROUND OF THE INVENTION

1. Field of the Invention

The invention relates to glass fiber reinforced polycarbonate compositions and molding compositions, which are distinguished by high rigidity, high flowability, high processing stability, good chemical resistance and good aging resistance vis-a.-vis the effects of light and heat compared with the prior art.

2. Description of Related Art

Compositions containing polycarbonate and rubber-modified styrene polymers, such as e.g. ABS (acrylonitrile-butadiene-styrene polymers), are known for their balance of excellent mechanical properties and good melt flowability. They are used in many different areas of application, for example, in car construction, in the building sector and in housings for office equipment and domestic appliances.

A low coefficient of thermal expansion and good dimensional stability, as well as shape stability and high rigidity, are generally needed to produce moulded parts with a large surface area. These properties can be achieved by the addition of fillers or reinforcing materials. High moduli of elasticity can be obtained particularly by adding fibrous reinforcing materials. However, the addition of the fillers or reinforcing materials generally has a disadvantageous effect on the toughness and particularly on the flow properties of the polymer melts, i.e. the processing characteristics. As a result, increased processing temperatures are usually required, which entails a further reduction in material toughness. The practicable degrees of filling with reinforcing material, and thus the material rigidities that can be achieved are, in effect, limited by these parameters, and moulded parts with large surface areas and very thin walls are often impossible to produce with those polycarbonate compositions that correspond to the prior art described below. For these areas of application there is a demand for such polycarbonate compositions to be produced with improved flowability and a higher modulus of elasticity, and with a toughness which is good over a broad processing window and stable vis-à-vis heat aging. Since moulded parts produced from compositions of this type are often painted and, in the context of the post-treatment needed in connection with this, generally come into contract with chemicals, such as e.g., paint solvents, there is a further demand for adequate chemical resistance. For this reason, the use of low molecular weight polycarbonates to improve the polymer melt flowability is out of the question, since these usually lead to a negative effect on stress cracking resistance.

Rubber-modified vinyl copolymers containing glass fiber reinforced polycarbonate compositions are known from the prior art.

WO-A 00/39210 discloses polycarbonate compositions containing polycarbonate, styrene resin, phosphoric ester and reinforcing agents (e.g. glass fibers), as well as optionally a graft polymer based on a silicone-acrylate composite rubber with a vinyl monomer-based graft shell, which are distinguished by improved hydrolysis resistance, good flame resistance and by improved mechanical properties. The styrene resins employed contain a rubber-based graft polymer. No glass fiber sizes are disclosed.

EP-A 1 240 250 discloses polycarbonate compositions containing 10-93 wt. % polycarbonate, 3-50 wt. % rubber elastic-based graft polymer, 3-50 wt. % thermoplastic copolymer and 1-20 wt. % of a mixture of particulate mineral and fibrous fillers, which are distinguished by reduced thermal expansion, good toughness, good dimensional stability and high flowability together with improved surface quality in the region of the gate.

EP-A 0 624 621 discloses polycarbonate compositions containing 10-80 wt. % polycarbonate, 10-80 wt. % rubber-modified graft polymer and 5-50 wt. % glass fibers with a coating containing polyolefin wax, which are distinguished by improved toughness and ductility.

EP-A 0 345 652 discloses polycarbonate compositions containing 10-75 wt. % polycarbonate, 10-50 wt. % rubber-based graft copolymer, up to 50 wt. % styrene copolymer, 0.5-50 wt. % terpolymer containing tert-butyl (meth)acrylate and 5 to 50 wt. % reinforcing agents (e.g. glass fibers), which are distinguished by high distinguished by high strength, good toughness and by low yellowing. The glass fibers used in this cited application are generally provided with a size and an adhesion promoter, but the composition of the size is not disclosed here.

The prior art documents cited above do not, however, disclose any compositions that contain polycarbonate, rubber-tree vinyl copolymers (e.g. styrene-acrylonitrile copolymers) and no rubber-containing graft polymer or only very small quantities thereof (i.e. up to 2 wt. %).

Disadvantages of the compositions described in the prior art, which contain rubber-modified graft polymers in quantities of more than 2 wt. %, are too low a melt flowability and inadequate aging resistance.

Compositions containing polycarbonate, glass fibers and rubber-free vinyl copolymer, which contain no rubber-modified vinyl copolymers or only very small quantities thereof, are also known from the prior art.

WO-A 84/04317 discloses polycarbonate compositions containing polycarbonate, styrene resin, unsized glass fibers and a hydrogen polysiloxane, which are distinguished by high impact resistance and a high modulus.

EP-A 0 647 679 discloses polycarbonate compositions containing special copolycarbonates with bisphenol and resorcinol monomer units, rubber-containing copolymer and/or copolymer of vinyl aromatic and cyanated vinyl monomer components as well as inorganic filler (e.g. glass fibers), which are distinguished by good flowability, high impact resistance and good surface quality. No glass fiber sizes are disclosed.

EP-A 1 038 920 discloses polycarbonate compositions substantially consisting of a special aromatic polycarbonate produced by melt polymerization, a styrene-based resin (e.g. a styrene-acrylonitrile copolymer with a styrene content of at least 20%, preferably at least 30%), a reinforcing fibrous filler and optionally an elastomeric polymer, which are distinguished by improved moist beat resistance and improved toughness. It is disclosed that the glass fibers used may be coated with a size made of polymers (such as e.g. epoxy resin, urethane resin, acrylic resin, nylon resin etc). In the examples, only compositions containing polyurethane-sized glass fibers are disclosed.

WO-A 2006/040087 discloses polycarbonate compositions containing polycarbonate, a terpolymer of styrene, acrylonitrile and maleic anhydride, and long glass fibers, which are distinguished by a combination of improved tensile strength, modulus of elasticity and impact resistance. In addition, these compositions preferably contain at least one polymer selected from the group of the rubber-containing graft polymers and robber-free copolymers. It is disclosed that the long glass fibers may be surface-modified with a size, without any information on the chemistry of the size being disclosed.

Although the glass fiber reinforced polycarbonate composition based on rubber-free styrene resins disclosed in the prior art do generally exhibit good melt flowability and aging resistance, they are, however, distinguished by inadequate toughness for certain areas of application, particularly at higher processing temperatures, and by unsatisfactory chemical resistance and rigidity.

SUMMARY OF THE INVENTION

This invention was therefore based, inter alia, on an object of providing free-flowing polycarbonate compositions which are resistant to aging vis-à-vis the effects of heat and light, with improved processing stability (i.e. stable toughness even at higher processing temperatures), improved rigidity and improved chemical resistance.

Surprisingly, it has been found that this object can be achieved by providing a composition comprising:
A) 10 to 85 parts by weight, preferably 30 to 80 parts by weight, especially 40 to 70parts by weight polycarbonate, polyester carbonate or a mixture thereof,
B) 10 to 50 parts fey weight, preferably 15 to 40 parts by weight, especially 20 to 35 parts by weight rubber-tree vinyl copolymer,
C) 5 to 50 parts by weight, preferably 7 to 35 parts by weight, especially 8 to 25 parts by weight of a sized glass fiber, wherein the size comprises as epoxy polymer,
D) 0 to 2 parts by weight, preferably 0 to 1 parts by weight, particularly preferably 0 parts by weight of rubber-modified graft polymers (in other words, the composition is preferably free of rubber-modified graft polymers), and
E) 0 to 10 parts by weight, preferably 0.01 to 5 parts by weight, especially 0.1 to 3 parts by weight of commercial polymer additives,
the composition further being free from rubber-modified polymers which differ from component D).

The sum of the components A+B+C+D+E is standardized to 100 parts by weight.

Additional objects, features and advantages of the invention will be set forth in the description which follows, and in part, will be obvious from the description, or may be learned by practice of the invention. The objects, features and advantages of the invention may be realized and obtained by means of the instrumentalities and combination particularly pointed out in the appended claims.

DETAILED DESCRIPTION OF A PREFERRED EMBODIMENT

Component A

Aromatic polycarbonates and/or aromatic polyester carbonates according to component A which are suitable according to the invention are known for example, from the literature and/or can be produced by processes known from the literature (for the production of aromatic polycarbonates, cf. for example Schnell, "Chemistry and Physics of Polycarbonates", Interscience Publishers, 1964, and DE-AS 1 495 626, DE-A 2 232 877, DE-A 2 703 376, DE-A 2 714 544, DE-A 3 000 610, DE-A 3 832 396; for the production of aromatic polyester carbonates, e.g. DE-A 3 077 934), the contents of which is incorporated herein by reference in their entireties.

The production of aromatic polycarbonates can take place e.g. by transesterification of diphenols with carbonic acid halides, preferably phosgene, and/or with aromatic dicarboxylic acid dihalides, preferably benzenedicarboxylic acid dihalides, by the interfacial polycondensation process, optionally using chain terminators, for example monophenols, and optionally using branching agents which are trifunctional or more than trifunctional, for example triphenols or tetraphenols. Production via a melt polymerization process by reaction of diphenols with, for example, diphenyl carbonate is also possible.

Diphenols for the production of the aromatic polycarbonates and/or aromatic polyester carbonates are preferably those of the formula (I)

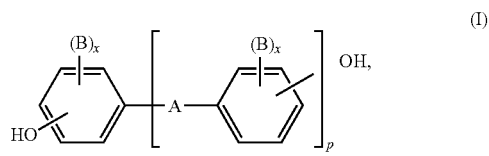

wherein
A is a single bond, $C_1$ to $C_5$ alkylene, $C_2$ to $C_5$ alkylidene, $C_5$ to $C_6$ cycloalkylidene, —O—, —SO—, —CO—, —S—, —SO$_2$—, $C_6$ to $C_{12}$ arylene, on to which further aromatic rings optionally containing heteroatoms may be condensed, or a radical of the formula (II) or (III)

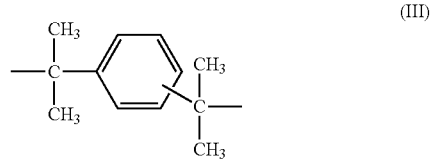

B in each case is $C_1$ to $C_{12}$ alkyl, preferably methyl, or halogen, preferably chlorine and/or bromine,
x in each case independently of one another, is 0, 1 or 2,
p is 1 or 0 and
$R^5$ and $R^6$ are selected individually for each $X^1$ and independently of one another denote hydrogen or $C_1$ to $C_6$ alkyl, preferably hydrogen, methyl or ethyl,
$X^1$ denotes carbon and
m denotes an integer from 4 to 7, preferably 4 or 5, with the proviso that on at least one atom $X^1$, $R^5$ and $R^6$ are simultaneously alkyl.

Preferred diphenols include hydroquinone, resorcinol, dihydroxydiphenols, bis(hydroxyphenyl)-$C_1$-$C_5$-alkanes, bis (hydroxyphenyl)-$C_5$-$C_6$-cycloalkanes, bis-(hydroxyphenyl) ethers, bis(hydroxyphenyl) sulfoxides, bis(hydroxyphenyl) ketones, bis-(hydroxyphenyl) sulfones and α,α-bis(hydroxyphenyl) diisopropylbenzenes and ring-brominated and/or ring-chlorinated derivatives thereof.

Particularly preferred diphenols are 4,4'-dihydroxydiphenyl, bisphenol A, 2,4-bis(4-hydroxyphenyl)-2-methylbutane, 1,1-bis(4-hydroxyphenyl)-cyclohexane, 1,1-bis(4-hydroxyphenyl)-3,3,5-trimethylcyclohexane, 4,4'-dihydroxydiphenyl sulfide, 4,4'-dihydroxydiphenyl sulfone and di- and tetra-brominated or chlorinated derivatives thereof, such as, for example, 2,2-bis(3-chloro-4-hydroxyphenyl)propane, 2,2-bis(3,5-dichloro-4-hydroxyphenyl)propane or 2,2-bis(3,5-dibromo-4-hydroxyphenyl)propane. 2,2-Bis(4-hydroxyphenyl)propane (bisphenol A) is especially preferred.

The diphenols may be employed individually or an any desired mixtures. The diphenols are known from the literature or obtainable by processes known from the literature.

Chain terminators which are suitable for the production of the thermoplastic, aromatic polycarbonates are, for example, phenol, p-chlorophenol, p-tert-butylphenol or 2,4,6-tribromophenol, and also long-chain alkylphenols, such as 4-[2-(2,4,4-trimethylpentyl)]phenol, 4-(1,3-tetramethylbutyl)phenol according to DE-A 2 842 005 or monoalkylphenol or dialkylphenols having a total of 8 to 20 carbon atoms in the alkyl substituents, such as 3,5-di-tert.-butylphenol, p-iso-octylphenol, p-tert.-octylphenol, p-dodecylphenol and 2-(3,5-dimethylheptyl)phenol and 4-(3,5-dimethylheptyl)phenol. The amount of chain terminators to be employed is generally between 0.5 mole % and 10 mole %, based on the sum of the moles of the particular diphenols employed.

The thermoplastic, aromatic polycarbonates may be branched in a known manner, and preferably by incorporation of 0.05 to 2.0 mole %, based on the sum of the diphenols employed, of compounds which are trifunctional or more than trifunctional, for example those having three and more phenolic groups.

Both homopolycarbonates and copolycarbonates are suitable. It is also possible for 1 to 25 wt. %, preferably 2.5 to 25 wt. %, based on the total amount of diphenols to be employed, of polydiorganosiloxanes having hydroxyaryloxy end groups to be employed for the production of copolycarbonates according to the invention according to component A. These are known (U.S. Pat. No. 3,419,634) and can be produced by processes known from the literature. The preparation of copolycarbonates containing polydiorganosiloxanes is described in DE-A 3 334 782.

Preferred polycarbonates are, in addition to the bisphenol A homopolycarbonates, the copolycarbonates of bisphenol A with up to 15 mole %, based on the sum of the moles of diphenols, of other diphenols mentioned as preferred or particularly preferred, in particular 2,2-bis(3,5-dibromo-4-hydroxyphenyl)propane.

Aromatic dicarboxylic acid dihalides for the production of aromatic polyester carbonates are preferably the diacid dichlorides of isophthalic acid, terephthalic acid, diphenyl ether-4,4'-dicarboxylic acid and of napththalene-2,6-dicarboxylic acid. Mixtures of the diacid dichlorides of isophthalic acid and of terephthalic acid in a ratio of between 1:20 and 20:1 are particularly preferred.

A carbonic acid halide, preferably phosgene, is additionally used as a bifunctional acid derivative in the production of polyester carbonates.

Possible chain terminators for the preparation of the aromatic polyester carbonates are, in addition to the monophenols already mentioned, also chlorocarbonates thereof as well as the acid chlorides of aromatic monocarboxylic acids, which may optionally be substituted by $C_1$ to $C_{22}$ alkyl groups or by halogen atoms, as well as aliphatic $C_2$ to $C_{22}$ monocarboxylic acid chlorides.

The quantity of chain terminators is in each case 0.1 to 10 mole %, based on the moles of diphenol in the case of the phenolic chain terminators and on the moles of dicarboxylic acid dichloride in the case of monocarboxylic acid chloride chain terminators.

The aromatic polyester carbonates may also contain incorporated aromatic hydroxycarboxylic acids.

The aromatic polyester carbonates may be either linear or branched in a known manner (in this context see DE-A 2 940 024 and DE-A 3 007 934, incorporated herein by reference in their entireties).

Branching agents which may he used include, for example, acyl chlorides which are trifunctional or more than trifunctional, such as trimesic acid trichloride, cyanuric acid trichloride, 3,3',4,4'-benzophenonetetracarboxylic acid tetrachloride, 1,4,5,8naphthalenetetracarboxylic acid tetrachloride or pyromellitic acid tetrachloride, in quantities of from 0.01 to 1.0 mole % (based on the dicarboxylic acid dichlorides employed), or phenols which are trifunctional or more than trifunctional, such as phloroglucinol, 4,6-dimethyl-2,4,6-tri-(4-hydroxyphenyl)hept-2-ene, 4,6-dimethyl-2,4,6-tri-(4-hydroxyphenyl)heptane, 1,3,5-tri-(4-hydroxyphenyl)benzene, 1,1,1-tri-(4-hydroxyphenyl)ethane, tri-(4-hydroxyphenylphenylmethane, 2,2-bis[4,4-bis(4-hydroxyphenyl)cyclohexyl]propane, 2,4-bis(4-hydroxyphenylisopropy)phenol, tetra-(4-hydroxyphenyl)methane, 2,6-bis(2-hydroxy-5-methylbenzyl)-4-methyl-phenol, 2-(4-hydroxyphenyl)-2-(2,4-dihydroxyphenyl)propane, tetra-(4-[4-hydroxyphenylisopropyl]phenoxy)methane and 1,4-bis[4,4'-dihydroxytriphenyl)methyl]benzene, in amounts of from 0.01 to 1.0 mole %, based on the diphenols employed. Phenolic branching agents may be initially introduced into the reaction vessel with the diphenols, and acid chloride branching agents may be introduced together with the acid dichlorides.

The proportion of carbonate structural units in the thermoplastic, aromatic polyester carbonates may he varied as desired. Preferably, the content of carbonate groups is up to 100 mole %, especially up to 80 mole %, particularly preferably up to 50 mole %, based on the sum of ester groups and carbonate groups. Both the ester and the carbonate content of the aromatic polyester carbonates may be present in the polycondensate in the form of blocks or in random distribution.

In a preferred embodiment, the component A has a weight-average molecular weight Mw (determined by GPC, light scattering or sedimentation) of 23,000 g/mole to 40,000 g/mole, preferably of 24,000 g/mole to 35,000 g/mole, especially of 25,000 to 32,000 g/mole.

Component B

In a preferred embodiment, component B is a rubber-free vinyl copolymer of

B.1 70 to 80 wt. %, preferably 72 to 78 wt. %, especially 75 to 78 wt. % (based in each case on component B), of at least one monomer selected from the group of the vinyl aromatics (such as, for example, styrene and α-methylstyrene) or ring-substituted vinyl aromatics (such as, for example, p-methylstyrene and p-chlorostyrene) and B.2 20 to 30 wt. %, preferably 22 to 28 wt. %, especially 22 to 25 wt. % (based in each case on component B), of at least one monomer selected from the group of the vinyl cyanides (such as, for example, unsaturated nitriles, such as acrylonitrile and methacrylonitrile), (meth) acrylic acid ($C_1$-$C_8$) alkyl esters (such as, for example, methyl methacrylate, n-butyl acrylate and tert.-butyl acrylate), unsaturated carboxylic acids and derivatives of unsaturated carboxylic acids (for example maleic anhydride and N-phenylmaleimide).

The copolymers B are resinous, thermoplastic and rubber-free. Particularly preferably, component B is a rubber-tree copolymer of styrene (B.1) and acrylonitrile (B.2).

Copolymers of this type are known and can be produced by free-radical polymerization, especially by emulsion, suspension, solution or bulk polymerization.

The (co)polymers preferably possess average molecular weights ($M_w$) (weight average, determined by GPC, light scattering or sedimentation) between 15,000 and 250,000 g/mole, particularly between 50,000 and 200,000 g/mole, especially between 80,000 and 160,000 g/mole.

Component C

In a preferred embodiment, component C is a sized glass fiber with
- C.1 a glass fiber selected from at least one component from the group comprising and advantageously consisting of continuous strands (rovings), long glass fibers and chopped glass strands,
- C.2 a size containing an epoxy polymer (in other words, the "size" fills pores in the glass fiber or provides a covering or glaze), and
- C.3 optionally an adhesion promoter.

Size C.2 and adhesion promoter C.3 are preferably employed in component C in an amount such that the carbon content measured in component C is 0.1 to 1 wt. %, preferably 0.2 to 0.8 wt. %, particularly preferably 0.3 to 0.7 wt. %.

The glass fibers according to component C.1 are preferably made from E-, A- or C-glass. The diameter of the glass fibers is preferably 5 to 25 μm, particularly preferably 6 to 20 μm, most preferably 7 to 15 μm. The long glass fibers preferably have a length of 5 to 50 mm, particularly preferably 5 to 30 mm, most preferably 7 to 23 mm. Long glass fibers are described e.g. in WO-A 2006/040087, the content of which is incorporated herein by reference. At least 70 wt. % of the glass fibers in the chopped glass strands preferably have a length of at least about 60 μm.

The size C.2 preferably comprises or consists of
- C2.1 50 to 100 wt. %, preferably 70 to 100 wt. %, particularly preferably 80 to 100 wt. % (based on C.2 in each ease) epoxy polymer and
- C2.2 0 to 50 wt. %, preferably 0 to 30 wt. %, particularly preferably 0 to 20 wt. % (based on C.2 in each case) of one or more other polymers.

Most preferably, in one embodiment the size C.2 consists exclusively of epoxy polymer C.21 (i.e. the size C.2 is free from other polymers according to component C.2.2).

The epoxy polymer according to C.2.1 can be an epoxy resin, an epoxy resin ester or an epoxy resin polyurethane, for example.

In a preferred embodiment, the epoxy polymer according to component C.2.1 is an epoxy resin comprising:
- C.2.1.1 epichlorohydrin and
- C.2.1.2 a preferably aromatic alcohol, which has at least two hydroxyl groups.

Component C.2.1.2 is preferably a phenolic resin, for example a novolak, or a compound of formula (I). Component C.2.1.2 is particularly preferably bisphenol A.

Component C.2.2 is preferably at least one polymer selected from the group consisting of polyurethanes, polyolefins, acrylate-containing polymers, styrene-containing polymers and polyamides.

Component C.3 is preferably a silane. In a preferred embodiment the silane possesses a functional group selected from the group of the amino group, epoxy group, carboxylic acid group, vinyl group and mercapto group for binding to the polymer of the size, as well as one to three, preferably three alkoxy groups for binding to the glass fiber. For example and preferably, at least one silane selected from the group consisting of vinyltrichlorosilane, vinyltriethoxysilane, vinyltrimethoxysilane, γ-methacryloxypropyltrimethoxysilane, β-(3,4-epoxycyclohexyl)ethyltrimethoxysilane, γ-glycidoxypropyltrimethoxysilane, N-β-(aminoethyl)-γ-aminopropyltrimethoxysilane, γ-aminopropyltriethoxysilane, N-phenyl-γ-aminopropyltrimethoxysilane, γ-mercaptopropyltrimethoxysilane, and γchloropropyltrimethoxysilane is used as component C.3. Sized glass fibers which contain the component C.3 typically exhibit better adhesion of the size to the glass fiber.

Component D

Component D comprises one or more graft polymers of
- D.1 5 to 70 wt. %, preferably 10 to 60 wt. %, especially 20 to 50 wt. % of at least one vinyl monomer on
- D.2 30 to 95 preferably 40 to 90 wt. %, especially 50 to 80 wt. % of one or more backbones with glass transition temperatures of <10° C., preferably <0° C., particularly preferably <−20° C.

Monomers D.1 are preferably mixtures of
- D.1.1 50 to 99 parts by weight vinyl aromatics and/or ring-substituted vinyl aromatics (such as styrene, α-methylstyrene, p-methylstyrene, p-chlorostyrene) and/or ($C_1$-$C_8$) alkyl methacrylates, such as methyl methacrylate, ethyl methacrylate, and
- D.1.2 1 to 40 parts by weight of vinyl cyanides (unsaturated nitriles such as acrylonitrile and methacrylonitrile) and/or ($C_1$-$C_8$) alkyl (meth)acrylates, such as methyl methacrylate, n-butyl acrylate, t-butyl acrylate, and/or derivatives (such as anhydrides and imides) of unsaturated carboxylic acids, for example maleic anhydride and N-phenylmaleimide.

Preferred monomers D.1.1 are selected from at least one of the monomers styrene, α-methylstyrene and methyl methacrylate; preferred monomers D.1.2 are selected from at least one of the monomers acrylonitrile, maleic anhydride and methyl methacrylate. Particularly preferred monomer combinations are D.1.1 styrene and D.1.2 acrylonitrile or D.1.1 and D1.2 methyl methacrylate.

The backbones D.2 suitable for the graft polymers D are, in a preferred embodiment, saturated, i.e. substantially free from double bonds. D.2 is particularly preferably at least one rubber selected from the group consisting of acrylate rubbers, silicone rubbers and. silicone-acrylate composite rubbers. Most preferably, d.2 is at least one rubber selected from the group consisting of silicone rubbers and silcone-acrylate composite rubbers.

Suitable acrylate rubbers according to D.2 include preferably polymers of alkyl acrylates, optionally with up to 40 wt. %, based on D.2, of other polymerisable, ethylenically unsaturated monomers. The preferred polymerisable acrylates include $C_1$ to $C_8$ alkyl esters, for example methyl, ethyl, butyl, n-octyl and 2-ethylhexyl esters; haloalkyl esters, preferably halo-$C_3$-$C_8$-alkyl esters, such as chloroethyl acrylate, as well as mixtures of these monomers.

For crosslinking purposes, monomers with more than one polymerizable double bond can be copolymerized. Preferred examples of crosslinking monomers include esters of unsaturated monomcarboxylic acids with 3 to 8 C atoms and unsaturated monohydric alcohols with 3 to 12 C atoms, or saturated polyols with 2 to 4 OH groups and 2 to 20 C atoms, such as ethylene glycol dimethyacrylate, allyl methacrylate; polyunsaturated heterocyclic compounds, such as trivinyl and trialkyl cyanurate; polyfunctional vinyl compounds, such as di- and trivinyl benzenes; but also triallyl phosphate and diallyl phthalate. Preferred crosslinking monomers are allyl methacrylate, ethylene glycol dimethacrylate, diallyl phthalate and heterocyclic compounds having at least three ethylenically unsaturated groups. Particularly preferred crosslinking monomers are the cyclic monomers triallyl cyanurate, triallyl isocyanurate, triacryloylhexahydro-s-triazine, triallyl benzenes. The quantity of the crosslinked monomers is preferably 0.02 to 5, especially 0.05 to 2 wt. %, based on the backbone D.2. In the case of cyclic crosslinking monomers with at least three ethylenically unsaturated groups, it is generally advantageous to limit the quantity to less than 1 wt. % of the backbone D.2.

Preferred "other" polymerizable, ethlenically unsaturated monomers which may optionally be used in addition to the acrylates for the production of the backbone D.2 are e.g. acrylonitrile, styrene, α-methylstyrene, acrylamindes, vinyl-$C_1$-$C_6$-alkyl ethers and methyl methacrylate.

Other suitable backbones according to D.2 include silicone rubbers with graft-active points, as described in DE-OS 3 704 657, DE-OS 3 704 655, DE-OS 3 631 540 and DE-OS 3 631 530.

The graft copolymers D can be produced for example by free-radical polymerization, preferably by emulsion polymerization.

The backbone D.2 generally has an average particle size ($d_{50}$ value) of 0.05 to 1 μm, preferably 0.07 to 0.5 μm, particularly preferably 0.1 to 0.4 μm. The average particle size $d_{50}$ is the diameter having 50 wt. % of the particles lying above it and 50 wt. % below it. It can be determined by means of ultracentrifuge measurement (W. Shloltan, H. Lange, Kolloid, Z. und Z. Polymere 250 (1972), 782-1796).

The gel content of the backbone D.2 in graft polymers produced by emulsion polymerization is preferably at least 30 wt. %, particularly preferably at least 40 wt. %, especially at least 50 wt. % (measured in toluene). The gel content is determined at 25° C. in a suitable solvent as the portion that is insoluble in these solvents (M. Hoffmann, H. Krömer, R. Kuhn, Polymeranalytik I and II, Georg Thieme-Verlag, Stuttgart 1977).

Since it is known that, during the graft reaction, the graft monomers are not necessarily grafted on to the backbone completely, graft polymers D according to the invention also include those products obtainable by (co)polymerization of the graft monomers in the presence of the backbone and jointly formed during the work-up. These products can therefore also contain free (co)polymer of the graft monomers, i.e. they are not chemically bonded to the rubber.

E) Other Components

The composition may contain other optional additives as component E, with polymer additives such as flame retardants (e.g. organic phosphorus or halogen compounds, especially bisphenol A-based oligophosphate), anti-drip agents (e.g. compounds of the classes of substances of the fluorinated polyolefins, the silicones and aramid fibers), lubricants and mould release agents, e.g. pentaerythritol tetrastearate, nucleating agents, antistatic agents, stabilisers, fillers and reinforcing materials other than component C (e.g. carbon fibers, talc, mica, kaolin, $CaCO_3$), as well as dyes and pigments (e.g. titanium dioxide or iron oxide), being particularly suitable.

Production of the Molding Compositions and Shaped Articles

The thermoplastic molding compositions according to the invention can be produced, for example, by mixing the respective components in a known manner and melt-compounding and melt-extruding them at temperatures of 200° C. to 320° C., preferably at 240 to 300° C., in conventional equipment such as internal mixers, extruders and twin screw extruders.

The mixing of the individual components can take place in a known manner, either successively or simultaneously, and either at about 20° C. (room temperature) or at a higher temperature.

In a preferred embodiment, the production of the compositions according to the invention takes place in a twin screw extruder, the components A, B, D and E first being melted and mixed and the glass fibers C then being introduced into the melt mixture via a subsidiary extruder and dispersed therein.

The invention thus also provides a process for the production of the compositions according to the invention.

The molding compositions according to the invention can be used for the production of shaped articles of all kinds. These can be produced, for example, by injection molding, extrusion and blow molding processes. Another form of processing is the production of shaped articles by thermoforming from previously produced sheets or films.

Examples of these shaped articles are films, profiles, all kinds of housing parts, e.g. for domestic appliances such as juice presses, coffee machines, mixers; for office equipment such as monitors, flat, screens, notebooks, printers, copiers; sheets, pipes, electrical installation ducts, windows, doors and other profiles for the construction sector (interior finishing and exterior applications) as well as electrical and electronic parts such as switches, plugs and sockets and components for utility vehicles, particularly for the car sector. The compositions according to the invention are also suitable for the production of the following shaped articles or moulded parts: interior fittings for rail vehicles, ships, aircraft, buses and other motor vehicles, body parts for motor vehicles, housings for electrical appliance containing small transformers, housings for equipment for data processing and transfer, housings and claddings for medical equipment, massage equipment and housings therefor, toy vehicles for children, flat wall elements, housings for safety devices, thermally insulated transport containers, moldings for sanitary and bath equipment, covering grid plates for ventilation openings and housings for garden equipment.

EXAMPLES

Component A:

Linear polycarbonate based on bisphenol A with a weight-average molecular weight $M_w$ of 28,000 g/mole (determined by GPC).

Component B-1:

SAN copolymer with an acrylonitrile content of 23 wt. % and a weight-average molecular weight of about 130,000 g/mole.

Component B-2:

ABS polymer with an acrylonitrile content:butadiene:styrene ratio of 20:28:52 wt. %, produced by emulsion polymerization.

Component C-1:

Chopped glass strands with an average diameter of 13 μm and a size made of epoxy resin produced from epichlorohydrin and bisphenol A. The carbon content of component C-1 is 0.6wt. %.

Component C-2:

Chopped glass strands with an average diameter of 13 μm and a polyurethane size. The carbon content of component C-1 is 0.4 wt. %.

Component D:

Metablen® SRK200 (Mitsubishi Rayon, Japan): styrene-acrylonitrile grafted acrylate-silicone composite rubber, produced by emulsion polymerization.

Component E-1: Pentaerythritol tetrastearate
Component E-2: Phosphite stabiliser Production and testing of the molding compositions according to the invention The components are mixed in a ZSK-25 twin screw extruder from Werner & Pfleiderer at a melt temperature of 260° C. The moldings are produced at melt temperatures of 260° C. and 300° C. and a mould temperature of 80° C. using an injection molding machine of the Arburg 270 E type.

The melt viscosity measured at 260° C. and a shear rate of 1000 s$^{-1}$ in accordance with ISO 11443 serves as a measure of the melt flowability.

The impact resistance is determined at 23° C. in accordance with ISO 180-1U on specimens measuring 80 mm×10 mm×4 mm. The specimens were injection moulded at melt temperatures of 260° C. and 300° C. The change in impact resistance $a_k$ on increasing the processing temperature serves as a measure of the processing stability of the composition and is calculated as follows:

$$\text{Processing stability} = \frac{a_K^{260°\,C.} - a_K^{300°\,C.}}{a_K^{260°\,C.}} * 100\%$$

The modulus of elasticity is determined on test bars injection moulded at 260° C., in accordance with ISO 527.

The stress cracking (ESC) resistance in rapeseed oil at room temperature serves as a measure of the chemical resistance. The time taken to fracture failure induced by stress cracking is determined on a specimen measuring 80 mm×10 mm×4 mm, injection moulded at a melt temperature of 260° C., which is subjected to an outer fiber strain of 2.4% using a strain jig and completely immersed in the medium. The measurement is performed on the basis of ISO 4599.

The reduction in impact resistance determined at 23° C. in accordance with ISO 180-1U on specimens measuring 80 mm×10 mm×4 mm, injection moulded at 260° C., when stored in hot air at 120° C. for 1500 h serves as a measure of heat aging resistance.

The change in color (change in grey scale) of specimens measuring 60 mm×40 mm×2 mm, injection moulded at 260° C., subjected to hot light aging in accordance with VW standard PV 1303 over 6 illumination cycles, serves a measure of UV light resistance.

TABLE 1

Molding compositions and their properties

| Components [parts by wt.] | | 1 (cp.) | 2 (cp.) | 3 (cp.) | 4 | 5 (cp.) | 6 (cp.) | 7 (cp.) | 8 | 9 (cp.) | 10 | 11 | 12 |
|---|---|---|---|---|---|---|---|---|---|---|---|---|---|
| A | PC | 60.64 | 60.64 | 60.64 | 60.64 | 49.75 | 49.75 | 49.75 | 49.75 | 61.81 | 61.94 | 49.46 | 43.52 |
| B-1 | SAN | — | 28.83 | — | 28.83 | — | 29.85 | — | 29.85 | 21.93 | 26.97 | 29.67 | 25.72 |
| B-2 | ABS | 28.83 | — | 28.83 | — | 29.85 | — | 29.85 | — | — | — | — | — |
| C-1 | GF (epoxy-sized) | — | — | 9.94 | 9.94 | — | — | 19.90 | 19.90 | 9.97 | 9.99 | 19.78 | 29.67 |
| C-2 | GF (PU-sized) | 9.94 | 9.94 | — | — | 19.90 | 19.90 | — | — | — | — | — | — |
| D | Metablen SRK200 | — | — | — | — | — | — | — | — | 5.98 | 0.50 | 0.49 | 0.49 |
| E-1 | PETS | 0.50 | 0.50 | 0.50 | 0.50 | 0.40 | 0.40 | 0.40 | 0.40 | 0.20 | 0.50 | 0.49 | 0.49 |
| E-2 | Irganox B900 | 0.10 | 0.10 | 0.10 | 0.10 | 0.10 | 0.10 | 0.10 | 0.10 | 0.10 | 0.10 | 0.10 | 0.10 |
| Properties | | | | | | | | | | | | | |
| Impact resistance $a_K^{260°\,C.}$ [kJ/m$^2$] | | 30 | 25 | 43 | 39 | 23 | 27 | n.t. | 40 | 39 | 37 | 40 | 38 |
| Impact resistance $a_K^{300°\,C.}$ [kJ/m$^2$] | | 33 | 17 | n.t. | 35 | n.t. | n.t. | n.t. | n.t. | 39 | 37 | 37 | 38 |
| Processing stability [%] | | −10.0 | 32.0 | n.t. | 10.3 | n.t. | n.t. | n.t. | n.t. | 0.0 | 0.0 | 7.5 | 0.0 |
| Melt viscosity [Pas] | | 315 | 193 | 329 | 229 | 333 | 187 | 356 | 202 | 247 | 212 | 198 | 233 |
| Modulus of elasticity [MPa] | | 3736 | 5147 | 3961 | 5070 | 5729 | 7000 | 5994 | 7488 | 4623 | 5189 | 7604 | 10178 |
| ESC-time to fracture [h] | | 1.5 | 0.1 | n.t. | 21 | 0.5 | 0.02 | n.t. | 19 | 2.5 | 11 | 8 | 0.07 |
| Change in toughness with heat aging (1500 h at 120° C.) [%] | | n.t. | n.t. | n.t. | n.t. | −41 | n.t. | n.t. | +4 | n.t. | n.t. | n.t. | n.t. |
| Colour change with hot light aging (change in grey scale in 6 cycles) | | n.t. | n.t. | n.t. | V | −1.5 | n.t. | V | +/−0 | n.t. | n.t. | n.t. | n.t. | n.t. = not tested

It can be seen from Table 1 that those compositions containing butadiene, rubber-modified styrene resin (comparative examples 1, 3, 5, 7 and 9) or SAN in combination with a relatively large amount of a rubber-modified graft polymer (comparative example 9) exhibit inadequate flowability and an inadequate modulus of elasticity compared with examples according to the invention having the same glass fiber content (examples 4, 8, 10-12). Moreover, when butadiene rubber-modified styrene resins are used (comparative examples 5), the heat aging and light resistance are also unsatisfactory. The compositions that do not contain glass fibers having an epoxy polymer-based size (comparative examples 1, 2, 5 and 6) are distinguished by poorer toughness compared with those comparable compositions with glass fibers having an epoxy polymer-based size. Although the rubber-free compositions containing glass fibers without an epoxy polymer-based size (comparative examples 2 and 6) do exhibit good flowability, they have very poor chemical resistance and processing stability. A good combination of flowability, rigidity, chemical resistance, toughness, processing stability and aging resistance under the effects of light and heat is only achieved in the compositions according to the invention (examples 4, 8, 10-12).

Although the invention has been described in detail in the foregoing for the purpose of illustration, it is to be understood that such detail is solely for that purpose and that variations may be made therein by those skilled in the art without departing from the spirit and scope of the invention except as it may be limited by the claims.

Additional advantages, features and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

All documents referred to herein are specifically incorporated herein by reference in their entireties.

As used herein and in the following claims, articles such as "the", "a" and "an" can connote the singular or plural.

What is claimed is:

1. A composition comprising
   A) 10 to 85 parts by weight of a polycarbonate, and/or a polyester carbonate,
   B) 10 to 50 parts by weight of a rubber-free vinyl copolymer of
      B.1 70 to 80 wt. %, based on the total weight of component B, of styrene and
      B.2 20 to 30 wt. %, based on the total weight of component B, of acrylonitrile
   C) 9.94 to 50 parts by weight of sized glass fiber with
      C.1 a glass fibers comprising at least one component selected from the group consisting of continuous strands, long glass fiber and chopped glass strands,
      C.2 a size, and
      C.3 optionally an adhesion promoter,
      wherein the size C.2 consists essentially of
      C.2.1 50 to 100 wt. %, based on the total weight of C.2, of an epoxy polymer comprising an epoxy resin made from,
      C.2.1.1 epichlorohydrin and
      C.2.1.2 bisphenol A as bisfunctional alcohol, and
      C.2.2 0 to 50 wt. %, based on the total weight of C.2, of at least one polymer selected from the group consisting of the polyurethanes, polyolefins, acrylate-containing polymers, styrene-containing polymers and polyamides,
      and wherein the sized glass fiber has a carbon content of 0.1 to 1 wt. %,
   D) 0 to 2 parts by weight of a rubber-modified graft polymer which is substantially free from double bonds and is selected from the group consisting of acrylate rubber, silicone rubber and silicone-acrylate composite rubber, and
   E) 0 to 10 parts by weight of a polymer additive, the composition being free from rubber-modified polymers which differ from component D),
   wherein the composition has a stress cracking ESC resistance in rapseed oil at room temperature of at least 8 to 21 hours as measured under ISO 4599.

2. The composition of claim 1, wherein:
   A) is a polycarbonate present in an amount of from 43.52 to 61.94 parts by weight;
   B) is present in an amount of from 25.72 to 29.85 parts by weight;
   C) is present in an amount of from 9.94 to 19.90 parts by weight;
   D) is present in an amount of from about 0 to about 0.5 parts by weight; and
   E) is present in an amount of from about 0 to about 0.6 parts by weight.

3. The composition of claim 1, having:
   a modulus of elasticity of from 5070 to 10178 mPa; and
   a melt viscosity (260° C.) is 198-233 Pas.

4. The composition of claim 1, wherein:
   A) is a linear polycarbonate based on Bisphenol A with a weight-average molecular weight of 25,000-32,000 g/mol;
   B) is SAN copolymer with an acrylonitrile content of 23 wt % and a weight-average molecular weight of about 130,000 g/mole, or ABS polymer with an acrylonitrile content:butadiene:styrene ratio of 20:28:52 wt %, produced by emulsion polymerization;
   C) is chopped glass strands with an average diameter of 13 μm and a size made of epoxy resin produced from epichlorohydrin and bisphenol A;
   D) is styrene-acrylonitrile grafted acrylate-silicone composite rubber, produced by emulsion polymerization; and
   E) is pentacrythritol tetrastearate, phosphite stabilizer, or a combination thereof.

5. The composition of claim 1, consisting of the recited components.

6. The composition of claim 2, consisting of the recited components.

7. The composition of claim 1, wherein the impact resistance ($a_x^{260° C.}$) is 37 to 40.